(12) United States Patent
Otterstedt et al.

(10) Patent No.: US 7,552,273 B2
(45) Date of Patent: Jun. 23, 2009

(54) MEMORY CIRCUIT AND METHOD FOR WRITING INTO A TARGET MEMORY AREA

(75) Inventors: Jan Otterstedt, Unterhaching (DE); Holger Sedlak, Lochhofen (DE)

(73) Assignee: Infineon Technologies AG (DE)

( * ) Notice: Subject to any disclaimer, the term of this patent is extended or adjusted under 35 U.S.C. 154(b) by 422 days.

(21) Appl. No.: 11/555,799

(22) Filed: Nov. 2, 2006

(65) Prior Publication Data
US 2008/0126717 A1 May 29, 2008

(30) Foreign Application Priority Data
Nov. 2, 2005 (DE) .................. 10 2005 052 293

(51) Int. Cl.
*G06F 12/00* (2006.01)
(52) U.S. Cl. .................... 711/103; 365/185.02; 711/154
(58) Field of Classification Search ................ 711/103, 711/154; 365/185.02
See application file for complete search history.

(56) References Cited

U.S. PATENT DOCUMENTS

| | | |
|---|---|---|
| 5,625,791 A | 4/1997 | Farrugia et al. |
| 6,160,738 A | 12/2000 | Atsumi et al. |
| 2004/0170060 A1 | 9/2004 | Ishimoto |

FOREIGN PATENT DOCUMENTS

DE    103 44 625 A1    10/2004

*Primary Examiner*—Kevin L Ellis
*Assistant Examiner*—Hashem Farrokh
(74) *Attorney, Agent, or Firm*—Dickstein, Shapiro, LLP.

(57) ABSTRACT

A memory circuit having a plurality of memory areas, whose order depends on respectively associated logical addresses, and which each have an associated control value, and a control means, which is designed such that the same assigns a value to a control value associated with a target memory area when writing into the same, which corresponds to the value of a lowest used memory area, when one exists, and assigns the same an arbitrary or predetermined value, when none exists, and when a predetermined condition is fulfilled, and when at least two used memory areas exist, rewrites the content of a next memory area, whose control value has a predetermined relation to the control value of the lowest memory area, and changes the control value of this memory area, when the same exists, or rewrites a content of the lowest memory area and changes the associated control value, when the next memory area, whose control value has a predetermined relation to the control value of the lowest memory area, does not exist.

18 Claims, 2 Drawing Sheets

FIG 2A

| LA | B | D | DH |
|---|---|---|---|
| 0 | 1 | a | 0 |
| 1 | 1 | b | 0 |
| 2 | 1 | c | 0 |
| 3 | 1 | d | 0 |
| 4 | 0 | | |
| 5 | 0 | | |
| 6 | 0 | | |
| 7 | 0 | | |

FIG 2B

| LA | B | D | DH |
|---|---|---|---|
| 0 | 1 | a | 0 |
| 1 | 1 | b | 0 |
| 2 | 1 | c | 0 |
| 3 | 1 | d | 0 |
| 4 | 0 | | |
| 5 | 1 | e | 0 |
| 6 | 0 | | |
| 7 | 0 | | |

Write →

FIG 2C

| LA | B | D | DH |
|---|---|---|---|
| 0 | 1 | a | 1 |
| 1 | 1 | b | 0 |
| 2 | 1 | c | 0 |
| 3 | 1 | d | 0 |
| 4 | 0 | | |
| 5 | 1 | e | 0 |
| 6 | 0 | | |
| 7 | 0 | | |

Refresh →

FIG 2D

| LA | B | D | DH |
|---|---|---|---|
| 0 | 1 | a | 1 |
| 1 | 1 | b | 0 |
| 2 | 1 | c' | 1 |
| 3 | 1 | d | 0 |
| 4 | 0 | | |
| 5 | 1 | e | 0 |
| 6 | 0 | | |
| 7 | 0 | | |

Write →

FIG 2E

| LA | B | D | DH |
|---|---|---|---|
| 0 | 1 | a | 1 |
| 1 | 1 | b | 1 |
| 2 | 1 | c' | 1 |
| 3 | 1 | d | 0 |
| 4 | 0 | | |
| 5 | 1 | e | 0 |
| 6 | 0 | | |
| 7 | 0 | | |

Refresh →

MEMORY CIRCUIT AND METHOD FOR WRITING INTO A TARGET MEMORY AREA

CROSS-REFERENCE TO RELATED APPLICATION

This application claims priority from German Patent Application No. 102005052293.9, which was filed on Nov. 2, 2005 and is incorporated herein by reference in its entirety.

BACKGROUND OF THE INVENTION

1. Field of the Invention

The present invention relates to a memory circuit and a method for writing into a target memory area, particularly to memory circuits with non-volatile memory elements, for example integrated circuits (IC) for chip cards.

2. Description of the Related Art

Nowadays, non-volatile memories (NVM) such as flash memories, are used in many products, for example in the field of embedded or integrated systems, respectively, and here particularly in the field of chip card ICs. During programming or writing of data, respectively, the problem of a shift of threshold voltages of the field-effect transistors used in those memories (flash FET of flash memory) arises in many types of non-volatile memories, particularly area-optimized types of non-volatile memories, and here particularly flash memories. The resulting problem is that frequently not only the threshold voltages of the selected memory cells to be programmed are altered, but also the threshold voltages of memory cells lying in the same sector, which should actually remain unaltered, are altered slightly. This effect or mechanism, respectively, is also referred to as "drain disturb", and can cause data loss of the disturbed memory cells by accumulation of the threshold voltage changes after many programmings within the respective sector. The too heavy accumulation of disturbances is avoided by recopying and refreshing the respective data on time. This mechanism is referred to as disturb handling and can be performed in different ways.

Disturb handling consists of explicitly storing a count with every programming process. If the difference of different counts in one sector becomes too large, which means exceeds a predetermined value, the areas with the smallest counts are recopied, which means the same are subject to a refresh. A disadvantage of this method is particularly the required implementation of the count in every separately programmable area (page), which is typically 16 bit or 32 bit per separately programmable area, and has thus typically a requirement of several percent of a memory field, typically approximately 3% of a memory field. Additionally, a further advantage is the required search of all counts within a sector when data are to be changed in this sector. Thus, on the one hand, this embodiment of disturb handling requires a high amount of memory for storing the counts and, on the other hand, a long runtime for searching and evaluating the counts.

A second method of disturb handling is an arbitrary selection of a programmable area for refresh. In this method, in every programming of a memory area of a sector, an arbitrary decision is made with a certain probability, whether an also arbitrarily selected area within the same sector will be recopied, which means subjected to a refresh. By determining or selecting the probability for reprogramming, it is ensured that statistically all areas are reprogrammed in time, before data loss occurs. A particular disadvantage of this method is the fact that due to the statistical nature of the method, either the reprogramming probability and thus the reprogramming rate has to be selected so high to ensure timely refresh of the data in any case, or, on the other hand, a certain probability for data loss has to be taken into account due to recopying of an area not being performed in time. Due to the length of a write process typical for a flash memory, compared to a read process, the effective write speed, which a later user realizes, is heavily reduced at a reprogramming probability, which leads to a high reprogramming rate. Additionally, with a recopying rate selected too high, the life time of a memory circuit is significantly decreased, since the average life time of a corresponding memory system is typically significantly determined by the number of write processes, so that with every write process but also with every recopy process, the remaining residual life time is decreased. If, however, the reprogramming probability is chosen such that a lower reprogramming rate results, an increased probability of data loss exists, which cannot be tolerated.

The second mentioned method is also described in U.S. Pat. No. 5,625,791. In this patent, a chip card with non-volatile electrically erasable and programmable memory is described, in which a method for automatical refresh of the content of certain zones of the memory is implemented, to avoid the risk due to aging of an EEPROM memory (EEPROM=electrically erasable programmable read only memory). The refresh described there can be performed after predetermined time intervals or at the end of predetermined number of usages, or also as a routine, whenever the card is supplied with current. If only part of a zone is addressed in the step of refreshing, the address of this part of the zone is determined by a random generator. In other words, the above-mentioned US patent describes the usage of a random number generator for determining any refresh address, when the chip card is powered up.

The U.S. Pat. No. 6,160,738 describes a non-volatile semiconductor memory system with a grid of non-volatile memory cells, which is divided into erasure blocks and refresh blocks. Additionally, the memory system has an arrangement of intermediate marking cells, wherein each intermediate marking cell is associated with a refresh block and buffers information about the refresh state of the associated refresh block. In other words, the recited US patent describes the usage of a separate arrangement of intermediate marking memories (flag array), where the refresh state of an associated block is stored and erased again separately.

The US patent application US 2004/0170060 A1 describes a semiconductor memory device with a detection means, which divides the semiconductor memory into refresh zones and determines a refresh zone which comprises a write target during a write process. The detection means refreshes the sectors belonging to the associated refresh zone, which had been determined by detection means, one after the other.

SUMMARY OF THE INVENTION

The present invention provides a memory circuit and a method for writing into a target memory area, which allows a less time-consuming and memory-straining possibility for refreshing a memory area.

In accordance with a first aspect, the present invention provides a memory circuit, having: a plurality of memory areas, the order of which depends on respectively associated logical addresses, and which each has an associated control value; a container containing information indicating which memory areas are used; and a controller designed to perform the following steps during writing into a target memory area of the plurality of memory areas: assigning a value corresponding to the control value associated with the lowest used memory area to the control value associated with the target memory area, when a used memory area exists, and assigning an arbitrary or predetermined value when no used memory area exists; and when a predetermined condition is fulfilled, and when at least two used memory areas exist, rewriting a content of a next memory area, whose control value has a predetermined relation to the control value of the lowest memory area, and changing the control value of the next memory area, when such a next memory area exists, and rewriting the content of the lowest memory area and changing the control value associated with the same, when the next memory area, whose control value has the predetermined relation to the control value of the lowest area, does not exist.

In accordance with a second aspect, the present invention provides a method for writing into a target memory area of a memory circuit with a plurality of memory areas, whose order depends on the respectively associated logical addresses, and which each have an associated control value, and with a means containing information indicating which memory areas are used, including: assigning a value corresponding to the control value associated with the lowest used memory area to the control value associated with the target memory area, when a used memory area exists, and assigning an arbitrary or predetermined value to the control value associated with the target memory area, when no used memory area exists; and when a predetermined condition is fulfilled and when at least two used memory areas exist, rewriting a content of a next memory area, whose control value has a predetermined relation to the control value of the lowest memory area, and changing the control value of the next memory area, when such a next memory area exists, and rewriting the content of the lowest memory area and changing the control value associated with the same, when the next memory area, whose control value has the predetermined relation to the control value of the lowest area, does not exist.

BRIEF DESCRIPTION OF THE DRAWINGS

These and other objects and features of the present invention will become clear from the following description taken in conjunction with the accompanying drawings, in which:

FIGS. 2a-e are a schematic illustration of the content of an inventive memory circuit with eight memory areas.

DESCRIPTION OF THE PREFERRED EMBODIMENTS

Figure 1:
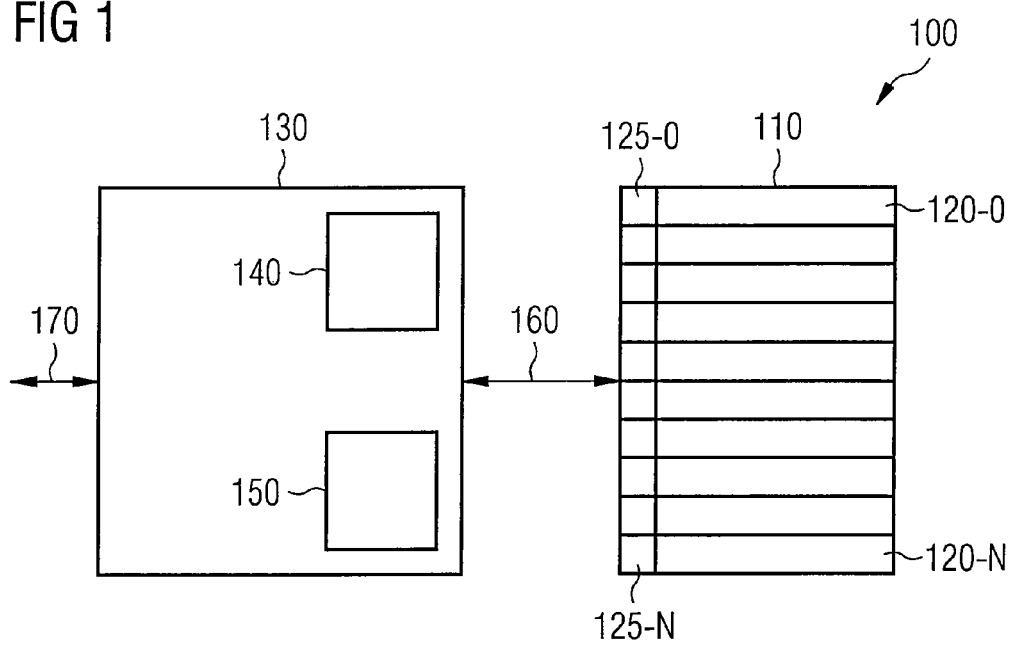
FIG. 1 is a schematic block diagram of an embodiment of an inventive memory circuit.

In the present application, the terms "refresh", "recopy" and "rewrite" relate to rewriting data into the same or another physical address, wherein the logical address remains unaltered. The terms "writing" and "programming" relate synonymously to writing data into a predetermined logical address, to which a physical address is associated or will be associated during the actual write process.

The present invention is based on the knowledge that a more efficient method for writing into a target memory area with regard to time and memory requirements can be obtained by testing during every writing into a target memory area based on a predetermined condition, whether rewriting of a memory area is to be performed.

In other words, in the inventive method, first, during every write process, an arbitrary decision is made, for example based on a predetermined probability, whether a memory area is to be rewritten within a sector, which comprises the memory area. Then, based on a control value associated with every memory area, a decision is made about which memory area is chosen for rewriting.

It is a particular advantage of this method that memory areas intended for rewriting are deliberately selected based on a control value, so that memory areas that had been rewritten immediately before cannot be used again immediately for rewriting, without having to use, for example, a significant memory portion for storing a counter. Additionally, this method offers the advantage that rewriting of a memory area does not have to be performed in every writing, so that the effective writing speed, which a user of an inventive memory circuit realizes, is not significantly reduced. Apart from a significant increase of the effective writing speed, the life time of an inventive memory circuit is significantly increased, since an average life time of an inventive memory circuit is significantly determined by the number of write processes, which means also the rewrite processes, as has already been discussed in the introducing sections of the present application.

In other words, within the inventive method, first, during every writing or every programming of a target memory area, an arbitrary decision is made, for example based on a predetermined probability, whether a memory area within a sector comprising the memory area will be recopied or rewritten, respectively. Then, for example based on only a single bit stored with the memory areas, it is decided which memory area exactly is selected for rewriting. It is a particular advantage that always "useful" areas are selected for rewriting, without having to use a significant memory portion for storing a counter.

With reference to FIGS. 1 and 2, an embodiment of a memory circuit and a method for writing into a target memory area will be described.

FIG. 1 shows a schematic block diagram of an embodiment of an inventive memory circuit 100 with a memory 110 with a plurality of memory areas 120-0 to 120-N, each having associated a control value memory position 125-0 to 125-N, and a control unit 130 with an association means or mapping unit 140, respectively, and a status memory 150. The control unit 130 is coupled to the memory 110 via a bidirectional bus 160. The control unit 130 can be coupled, for example, to a memory control via a further bidirectional bus 170. Alternatively, the control unit 130 can be part of a memory control.

It is a significant object of the control unit 130 to perform an association between a logical address LA and a physical memory area 120. This conversion performed by the mapping unit 140 allows, on the one hand, to exclude defect physical memory areas 120 from possible data storage, and, to perform, on the other hand, flexible assignment of logical addresses LA to physical memory areas 120. Thereby, it is, for example, possible to define an order based on the logical addresses LA, without the physical memory areas 120 needing to have a corresponding arrangement, which means an arrangement according to this order. This allows particularly to change the association between logical addresses LA and physical memory areas 120 during the operation of the memory circuit 100, and to adapt the same to respective operating conditions. The conversion performed by the mapping unit 140 of the control unit 130 allows to define logic memory areas, which are clearly defined by the logical addresses LA. Additionally, the control unit 130 has the status memory 150, which contains information about usage or non-usage of a logic memory area in the present embodiment. Thus, together with the mapping unit 140, the status memory 150 enables specific access to all used logic memory areas.

Every separately programmable logic memory area has one bit, which is also referred to as DH bit, and to which the control value memory position 125-0 to 125-N is associated in connection with the associated physical memory areas 120-0 to 120-N, wherein in the same programming process, but independent of the other data stored in the respective memory area, the value 0 or 1 can be stored. In terms of a conventional technology, every memory area 120-0 to 120-N can be a memory page, while the memory areas 120-1 to 120-N together form a memory sector, which thus has a plurality of pages. The mentioned memory is divided into several sections, such that only the memory pages within a sector influence each other via the "drain disturb" mechanism described in the introducing sections of the present application. The memory pages are addressed via addresses or logical addresses, respectively, within a sector, and have thus a defined order with a "highest page" and a "lowest page". This order does not necessarily need to be given by increasing the logical address by 1 each time. However, for simplicity reasons, such an order is used as ordering criteria or search sequence, respectively, in the described embodiment. The lowest page represents the page with the lowest logical address, and the next page represents the page with the next higher logical address.

Based on the just described conditions, a clear implementation of the inventive method for writing into a target memory area, as can be performed in the memory circuit 100, will be described below. Here, the terms "writing" and "programming" are also used synonymously, such as the terms "rewriting" and "recopying" are used synonymously for a refresh process.

If an unused page is to be programmed in a respective sector, or the content of an already used page is to be changed (reprogrammed) in the respective sector, the following steps are performed:

a. Searching the "lowest" used page in the respective sector and reading the DH bit of the lowest used page.

b1. If a used page exists in the respective sector, setting the DH bit of the page to be programmed or reprogrammed (target page) to a value identical to the value of the DH bit of the lowest used page. This is also to be performed when reprogramming of the lowest used page is performed. Thus, in this case, the DH bit is maintained.

b2. If no used page exists in the respective sector, which means no "lowest" used page exists, the DH bit of the page to be programmed is set to an arbitrary or predetermined value 0 or 1.

c. Programming or reprogramming the page of the respective sector to be programmed.

d. Deciding based on a (pseudo) random number and a predetermined probability, whether rewriting of a page within the respective sector is to be performed. If this is not the case, programming or reprogramming, respectively, ends here.

If rewriting is to be performed, the following steps are performed:

e. Searching the lowest used page in the respective sector and reading the DH bit of the same.

f. Searching the "next" used page in the selected sector with a DH bit, which is set inverse to the DH bit of the "lowest" used page. The result of this search determines the further procedure:

g1. If no next used page exists, the write process or the method, respectively, ends here.

g2. If a next used page exists, but no next used page exists with a DH bit inverse in relation to the lowest used page, the lowest used page is rewritten and thereby its DH bit is inverted.

g3. If a next used page exists with a DH bit inverse in relation to the lowest used page, the next used page is rewritten with the inverse DH bit and thereby its DH bit is inverted.

Here, the control unit 130 and the mapping unit 140 can change the association between a logic memory area and a physical memory area during every writing memory access. This means particularly that, for example, during changing the content of a logic memory area, a new, previously unused physical memory area takes up the data to be written, and the respective association between the logical address LA and the physical memory area is correspondingly changed in the mapping unit 140.

For explaining the method in more detail, FIG. 2 shows a schematic representation of a memory sector with eight pages having logical addresses LA from 0-7. Apart from the logical address LA, FIG. 2 shows information or a status value, respectively, about the usage B of the page, for every page, wherein a state B=0 stands for an unused and B=1 for a used page. Additionally, FIG. 2 shows the content D of the respective page as well as the value DH of the DH bit. FIG. 2a shows a starting state of a memory, where the pages with the logical addresses 0-3 are used, and thereby have the memory contents a, b, c and d. The DH bits DH of the four used pages LA=0 to LA=3 each have the value 0.

Starting from this starting state, a value E is to be programmed, into a page with logical address LA=5, for example in a first writing process.

According to the above-described method, the lowest used page in the respective sector is searched and the DH bit of the lowest used page is readout for determining the DH bit for the page with the logical address LA=5. In the example shown in FIG. 2a, this is the page with the logical address LA=0 with the DH bit value DH=0. The DH bit of the page with the logical address LA=5 is correspondingly also set to the value 0. Since the page with the logical address LA=5 is used after the writing process, the status value B of the sixth page (LA=5) is set, so that the state shown in FIG. 2b results after terminating the programming step (step c).

In the example shown in FIG. 2, it is assumed that based on a respective (pseudo) random number and a predetermined probability, a decision is made that a refresh step is performed. Thus, corresponding to the above step e, the DH bit of the lowest used page in the respective sector is searched, and the respective DH bit is read. In the present example, this is again the first page with the logical address LA=0 with a DH bit with a value DH=0.

Since a next used page exists, but no next used page with DH bit inverse to the DH bit of the lowest used page LA=0, corresponding to step g2, the lowest used page is rewritten and its DH bit is inverted. This means that in the present example the page with the logical address LA=0 is rewritten and its DH bit is inverted, so that the state illustrated in FIG. 2c results. Thus, a first writing process is terminated.

As has already been discussed above, in the step of rewriting, the logical address LA of the page is maintained, so that the order of pages does not change.

Irrespective of this, during the step of rewriting, a new physical memory area 120 can be associated with the page with the logical address LA=0 by the control unit 130. A respective change of the association between logical addresses of pages and the physical memory areas 120 is performed by the mapping unit 140.

If starting from the state shown in FIG. 2c, the content of the page with the logical address LA=2 is replaced by a value c' in a further writing process, which means the page with the logical address LA=2 is overwritten, the DH bit of the respective page is set to the value DH=1 due to the steps a-c of the above-described embodiment. This is due to the fact that the lowest used page is the page LA=0, which has a DH bit value DH=1. Thus, the state illustrated in FIG. 2d results after termination of step c.

If it is decided in step d, that rewriting is to be performed, the lowest used page is searched in step e, and its DH bit is read. In the present case, this is again the first page LA=0 with the DH bit DH=1. In step f, the next used page with the DH bit of the page LA=0 inverse to the DH bit is searched. This is the page with the logical address LA=0, since the same has a DH bit DH=0. Consequently, corresponding to step g3, the page with the logical address LA=1 is rewritten and its DH bit is inverted, so that the state shown in FIG. 2e results.

Here, the physical memory areas can have changed, both in the step of changing the content of page LA=2, as well as in the step of rewriting page LA=1, without any changes of the underlying logical addresses LA, so that the order of pages has remained unchanged. The possibly accompanying change of the physical memory areas is again considered by the control unit 130 and the mapping unit 140.

The above-described embodiment of the inventive method for writing into a target memory area, which comprises disturb handling with a memory bit for every memory area, which is stored as marking (flag) within every memory area or within every memory block, respectively, clearly shows the advantages of the inventive method. By introducing the DH bit for all memory areas, the memory is separated in two groups in relation to the application of a refresh, wherein always only pages of one of the two groups are selected for refresh. If, for example, at a certain time, only pages of a first group are selected for a refresh, these pages are associated with the second group of the memory areas after a performed refresh due to the inversion of the DH bit. Since newly programmed or reprogrammed, respectively, which means overwritten pages are automatically associated with the second group of the memory areas according to the inventive method, it is ensured that no page is subjected to a refresh, as long as there is a page that has not been changed by a writing memory access for some time. Since the association of one page to one of the two groups is made via the value of the corresponding DH bit, the inventive method has a "current" DH bit value, with which all further writing memory accesses are performed.

In the memory map shown in FIG. 2, the "current" DH bit value in the case of FIGS. 2d and 2e is the value DH=1, since the same is the DH bit value of the lowest used page, which means the page with the logical address LA=0. FIGS. 2b and 2c show the case where the "current" DH bit value is changed due to the inventive method. While in the example shown in FIG. 2d, the newly written content of the sixth page (LA=5) still obtains the current DH bit value DH=0, the "new" current DH bit value DH=1 is assigned to the logic memory area with the logical address LA=0 (first page), which is subjected to a refresh process.

The described method has the effect that a more recent page with the just "current" DH bit value is never selected for rewriting, when an older page exists with a DH bit value inverse to the "current" DH bit value. Thereby, the statistics of rewrite processes is significantly improved, since merely "useful" pages are selected for rewriting. This again reduces significantly the number of required rewrite processes, since now only selective rewrite processes of pages are performed, which have a DH bit value inverse to the current DH bit value, if they exist.

Additionally, the time required for the selection of a logic memory area intended for rewriting is reduced, since due to the arrangement of pages by the introduction of an order, only in a few cases all used pages have to be searched or considered in a rewrite process. Rather, in a plurality of refresh processes, only a small fraction of the used pages has to be searched for a used page with a certain value of the DH bit.

The fact that the DH bit, which means the associated control value memory position 125-0 to 125-N is part of the respective logic or associated physical memory area 120-0 to 120-N, has the effect that the number of memory accesses is minimized compared to a central storage of the DH bit in a certain arrangement (array). Thereby, the number of disturbances triggered by intervention of disturb handling itself, is also significantly reduced. Additionally, no additional memory requirement has to be reserved, for example in a volatile memory (RAM), which could be lost in the case of a sudden failure of the operating voltage. Minimizing the writing memory accesses in the area of the non-volatile memory has also the effect of a prolonged life time of the memory circuit, since the average life time of a non-volatile memory is significantly limited by the number of writing memory accesses.

The above-described embodiment of the inventive method also works when independent thereof any pages are erased at any time, which means previously used pages are again marked as unused and possibly erased, which means overwritten with a predetermined value.

Although in the above embodiment of the inventive method for writing into a target memory area only a single bit has been used for every logic memory area as memory for a control value, instead of a single bit, a plurality of bits can be used for that purpose. Thus, the individual logic memory areas can have a marking comprising several bits (token), so that apart from a separation of the memory areas into two segments, a separation into more than two groups can be performed. Thus, basically, it is, for example, possible to subject different groups to a refresh with a different frequency. Thereby, an increased failure security can be realized for certain memory areas.

Additionally, the order of executing the substep blocks discussed in the above-described embodiment, which comprise, on the one hand, steps a-c and, on the other hand, steps d-g, can be exchanged. In other words, the refresh process or reprogramming, respectively, can also be performed prior to the actual programming or the actual writing, respectively. This variation possibility requires only a slight modification of the description of the above-discussed embodiment of the inventive method, wherein mainly only adaptations of the requirements to a premature completion or premature termination, respectively, of the refresh process (method termination) are required.

Further, the addresses or logical addresses of the logic memory areas do not necessarily have to predetermine the search order of the logic memory areas in the way shown by the above-described embodiment. Basically, any determined order of logic memory areas or pages, respectively, within a sector can be used as order criteria for searching the pages, since basically any order is suitable in the sense of the present invention, as long as the same comprises every logic memory area exactly once. Thus, apart from the order of the arrangement of logic memory areas according to their increasing logical address described in the embodiment, an arrangement according to decreasing logical address LA is also possible.

Additionally, mixed forms of an increasing and decreasing arrangement are possible, where, for example, first all even pages are searched in increasing order, and then all odd pages are searched in decreasing order. In this context, it is only important that every page or every logic memory area, respectively, has to be searched exactly once based on the logical addresses LA in a fixed order.

Further, another predetermined condition for accelerating the refresh substep block, which means a change of step d of the above-described embodiment, can be used. Apart from an analysis of a (pseudo) random number described in the embodiment, there is further the possibility to start the refresh process for example only after expiry of a predetermined time period. Alternatively, the refresh process can also be performed after a predetermined number of writing memory accesses or at a certain system time.

Depending on the circumstances, the inventive method for writing into a target memory area can be implemented in hardware or in software. The implementation can be made on a digital memory medium, for example a disc, a CD or DVD with electronically readable control signals, which can cooperate with a programmable computer system such that the inventive method for writing into a target memory area is performed. Thus, generally, the invention consists also of a software program product or computer program product or a program product with a program code stored on a machine-readable carrier for performing the inventive method, when the software program product runs on a computer or processor. In other words, the invention can be realized as computer program or software program or program with a program code for performing the method, when the program runs on a computer. The processor can thereby be formed by a computer, a chip card (smart card) or another integrated circuit.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A memory circuit, comprising:
    a plurality of memory areas, the order of which depends on respectively associated logical addresses, and which each has an associated control value;
    a container containing information indicating which memory areas are used; and
    a controller, designed to perform the following steps during writing into a target memory area of the plurality of memory areas:
        assigning a value corresponding to the control value associated with the lowest used memory area to the control value associated with the target memory area, when a used memory area exists, and assigning an arbitrary or predetermined value when no used memory area exists; and
        when a predetermined condition is fulfilled, and when at least two used memory areas exist,
            rewriting a content of a next memory area, whose control value has a predetermined relation to the control value of the lowest memory area, and changing the control value of the next memory area, when such a next memory area exists, and
            rewriting the content of the lowest memory area and changing the control value associated with the same, when the next memory area, whose control value has the predetermined relation to the control value of the lowest area, does not exist.

2. The memory circuit according to claim 1, wherein the control values are stored in control value memories included in the respectively associated memory areas.

3. The memory circuit according to claim 1, wherein the predetermined relation defines that the control values differ.

4. The memory circuit according to claim 1, wherein the control values each have exactly one bit, which can assume two different logic states.

5. The memory circuit according to claim 4, wherein changing one of the control values corresponds to inverting the logic state of the control value.

6. The memory circuit according to claim 1, wherein the predetermined condition is fulfilled when a pseudo random number assumes a value within a predetermined value range.

7. The memory circuit according to claim 1, wherein the predetermined condition is fulfilled when a predetermined number of writing processes have been performed, when a predetermined time period has expired, or when a predetermined system time has been achieved.

8. The memory circuit according to claim 1, wherein the memory areas are memory pages, which form a memory sector.

9. A method for writing into a target memory area of a memory circuit with a plurality of memory areas, whose order depends on the respectively associated logical addresses, and which each have an associated control value, and with a container containing information indicating which memory areas are used, comprising:
    assigning a value corresponding to the control value associated with the lowest used memory area to the control value associated with the target memory area, when a used memory area exists, and assigning an arbitrary or predetermined value to the control value associated with the target memory area, when no used memory area exists; and
    when a predetermined condition is fulfilled and when at least two used memory areas exist,
        rewriting a content of a next memory area, whose control value has a predetermined relation to the control value of the lowest memory area, and changing the control value of the next memory area, when such a next memory area exists, and
        rewriting the content of the lowest memory area and changing the control value associated with the same, when the next memory area, whose control value has the predetermined relation to the control value of the lowest area, does not exist.

10. The method of claim 9, wherein the control values are stored in control value memories included in the respectively associated memory areas.

11. The method of claim 9, wherein the predetermined relation defines that the control values differ.

12. The method of claim 9, wherein the control values each have exactly one bit, which can assume two different logic states.

13. The method of claim 12, wherein changing one of the control values corresponds to inverting the logic state of the control value.

14. The method of claim 9, wherein the predetermined condition is fulfilled, when a pseudo random number assumes a value within a predetermined value range.

15. The method of claim 9, wherein the predetermined condition is fulfilled, when a predetermined number of writing processes has been performed, when a predetermined time period has expired, or when a predetermined system time has been achieved.

16. The method of claim 9, wherein the memory areas are memory pages forming a memory sector.

17. A computer readable storage medium having a program with a program code for performing the method for writing into a target memory area according to claim 9, when the program runs on a processor.

18. A memory circuit, comprising:
- a plurality of memory areas, the order of which depends on respectively associated logical addresses, and which each has an associated control value;
- a container means for containing information indicating which memory areas are used; and
- a control means for performing the following steps during writing into a target memory area of the plurality of memory areas:
  - assigning a value corresponding to the control value associated with the lowest used memory area to the control value associated with the target memory area, when a used memory area exists, and assigning an arbitrary or predetermined value when no used memory area exists; and
  - when a predetermined condition is fulfilled, and when at least two used memory areas exist,
    - rewriting a content of a next memory area, whose control value has a predetermined relation to the control value of the lowest memory area, and changing the control value of the next memory area, when such a next memory area exists, and
    - rewriting the content of the lowest memory area and changing the control value associated with the same, when the next memory area, whose control value has the predetermined relation to the control value of the lowest area, does not exist.

* * * * *